United States Patent [19]

Schoenauer et al.

[11] 4,376,077
[45] Mar. 8, 1983

[54] SULPHO GROUP-CONTAINING ANTHRAQUINONE DYESTUFFS

[75] Inventors: Wolfgang Schoenauer, Riehen, Switzerland; Roland Wald, Huningue, France

[73] Assignee: Sandoz Ltd., Basel, Switzerland

[21] Appl. No.: 958,182

[22] Filed: Nov. 6, 1978

Related U.S. Application Data

[63] Continuation of Ser. No. 852,816, Nov. 18, 1977, abandoned, which is a continuation of Ser. No. 775,423, Mar. 8, 1977, abandoned, which is a continuation of Ser. No. 601,880, Aug. 4, 1975, abandoned, which is a continuation-in-part of Ser. No. 440,435, Feb. 7, 1974, abandoned.

[30] Foreign Application Priority Data

Feb. 8, 1973 [CH] Switzerland ................... 1802/73

[51] Int. Cl.³ .......................................... C07C 143/665
[52] U.S. Cl. .................................................... 260/373
[58] Field of Search ........................................ 260/373

[56] References Cited

U.S. PATENT DOCUMENTS

| | | | |
|---|---|---|---|
| Re. 27,800 | 10/1973 | Schwander et al. | 260/374 |
| 3,420,856 | 1/1969 | Bengueral | 260/374 |
| 3,491,126 | 1/1970 | Schwander et al. | 260/373 |
| 3,646,071 | 2/1972 | Frey et al. | 260/373 |
| 3,823,168 | 7/1974 | Hohmann et al. | 260/373 |
| 3,980,677 | 9/1976 | Hohmann et al. | 260/373 |
| 4,035,397 | 7/1977 | Pechmeze et al. | 260/373 |

FOREIGN PATENT DOCUMENTS

| | | | |
|---|---|---|---|
| 1461074 | 10/1966 | France | 260/373 |
| 526678 | 9/1972 | Switzerland | 260/373 |
| 449012 | 6/1936 | United Kingdom | 260/373 |
| 929060 | 9/1964 | United Kingdom | 260/373 |

OTHER PUBLICATIONS

Benguerel; F. "Anthraquinones" in Chemical Abstracts #113550, vol. 64, 1966.

Primary Examiner—Charles F. Warren
Assistant Examiner—Raymond K. Covington
Attorney, Agent, or Firm—Gerald D. Sharkin; Robert S. Honor; Joseph J. Borovian

[57] ABSTRACT

Disclosed are anthraquinone dyestuffs which, in free acid form, are of formula I,

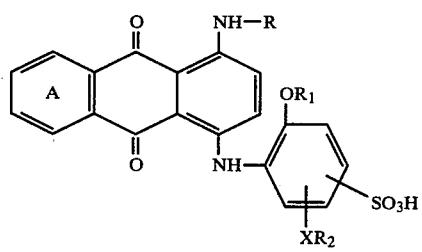

in which R signifies an alkyl radical of 6 to 24 carbon atoms, an unsubstituted cyclohexyl radical or a cyclohexyl radical substituted by one or more substituents selected from halogen atoms and alkyl and alkoxy radicals, $R_1$ and $R_2$, independently, each signifies an alkyl radical of 1 to 6 carbon atoms, X signifies —O— or a direct bond, ring A is unsubstituted or substituted by one or two halogen atoms, hydroxyl groups or $C_{1-4}$alkyl or alkoxy groups, their production and use in the dyeing of anionic dyeable substrates, particularly natural and synthetic polyamide fibers.

1 Claim, No Drawings

SULPHO GROUP-CONTAINING ANTHRAQUINONE DYESTUFFS

This is a continuation of application Ser. No. 852,816, filed Nov. 18, 1977 now abandoned, which in turn is a continuation of Ser. No. 775,423, filed Mar. 8, 1977, now abandoned, which in turn is a continuation of Ser. No. 601,880, filed Aug. 4, 1975, now abandoned, which in turn is a continuation-in-part of Ser. No. 440,435, filed Feb. 7, 1974, now abandoned.

The invention relates to sulpho group containing anthraquinone compounds.

More particularly, the invention relates to compounds which, in free acid form, are of formula I,

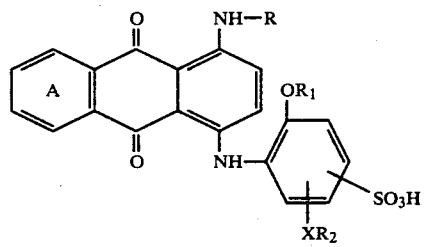

in which
R signifies an alkyl radical of 6 to 24 carbon atoms, an unsubstituted cyclohexyl radical or a cyclohexyl radical substituted by one or more substituents selected from halogen atoms and alkyl and alkoxy radicals,
$R_1$ and $R_2$, independently, each signifies an alkyl radical of 1 to 6 carbon atoms,
X signifies —O— or a direct bond,
ring A is unsubstituted or substituted by one or two halogen atoms, hydroxyl groups or $C_{1-4}$alkyl or alkoxy groups.

Where R signifies an alkyl radical of 6 to 24 carbon atoms, such radical is preferably of 6 to 18, more preferably 6 to 12 carbon atoms and, as examples, may be given n-hexyl, n-heptyl, heptyl-3, n,octyl, iso-octyl, n-nonyl, di-iso-butylmethyl, decyl and lauryl.

Where R signifies a cyclohexyl radical substituted by alkyl or alkoxy radicals, such alkoxy and alkyl radicals are preferably of 1 to 6 carbon atoms, more preferably of 1, 2, 3 or 4 carbon atoms. Any cyclohexyl radical as R is preferably unsubstituted or substituted by 1, 2 or 3 alkyl radicals of 1 to 4 carbon atoms, preferably methyl or ethyl radicals and most preferably methyl radicals and, as examples, may be given cyclohexyl, 2-, 3- and 4-methylcyclohexyl, 2-, 3- and 4-ethylcyclohexyl, 3,5-dimethylcyclohexyl and 2,4,6-, 3,4,5- and 3,3,5-trimethylcyclohexyl radicals, of which unsubstituted cyclohexyl and 3,3,5-trimethylcyclohexyl are particularly preferred.

As examples of alkyl radicals as $R_1$ and $R_2$ may be given methyl, ethyl, n-propyl, iso-propyl, n-butyl, sec-butyl, tert.butyl, n-amyl, iso-amyl and n-hexyl. Those of 1 to 4 carbon atoms, and particularly methyl and ethyl are preferred.

When X signifies oxygen, the alkoxy radicals $R_1$—O— and $R_2$—O— are preferably identical.

Whilst the group —X—$R_2$ may be in any position in the benzene nucleus to which it is attached, it is preferably either in para-position to the amino group or in para-position to the $R_1$—O— group, more preferably the latter.

Any halogen present in the compound may be fluorine, chlorine, bromine or iodine; chlorine, however, being preferred.

Any alkyl or alkoxy groups present as substituents on ring A are preferably of 1 to 4, more preferably 1 or 2 carbon atoms.

Any alkyl radicals or halogen atoms as substituents on ring A may be in any of the α- or β-positions, whilst any alkoxy or hydroxy radicals preferably in α-positions.

Ring A is preferably unsubstituted.

Preferred compounds of the invention are compounds which, in free acid form, are of formula I',

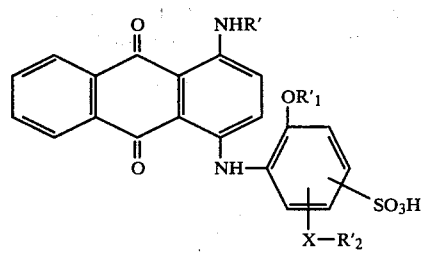

in which
X is as defined above,
R' signifies an alkyl radical of 6 to 18 carbon atoms, an unsubstituted cyclohexyl radical or a cyclohexyl radical bearing 1, 2 or 3 alkyl radicals of 1 to 4 carbon atoms, and
$R_1'$ and $R_2'$, independently, each signifies an alkyl radical of 1 to 4 carbon atoms.

In the compounds of formula I', any alkyl radicals as substituents on the cyclohexyl radical are preferably methyl or ethyl, more preferably methyl. R', when signifying an alkyl radical, preferably signifies an alkyl radical of 6 to 12 carbon atoms. The group —X—$R_2'$ is preferably in p-position to the $R_1'$—O— group.

Further preferred compounds of the invention are compounds which, in free acid form, are of formula I'',

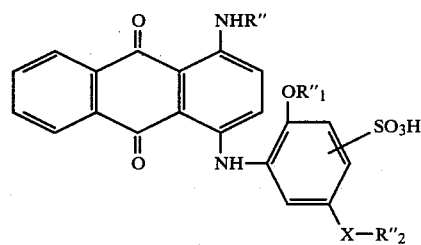

in which
X is as defined above,
R'' signifies a cyclohexyl or 3,3,5-trimethylcyclohexyl radical, and
$R_1''$ and $R_2''$, independently, each signifies a methyl, ethyl or butyl radical.

In the compounds of the invention, whether of formula I, I' or I'', in free acid form, X preferably signifies a direct bond.

In the above formulae I, I' and I'', the compounds are shown in their free acid form. They may, of course, be obtained in salt forms. Such salt forms are embraced by the present invention. The particular salt forms of the compounds of the invention are not critical provided that where the compounds are used as dyes, as hereinafter described, the cations are preferably non-chromophoric. As examples of suitable salt forms of the compounds of the invention may be given the alkali-metal salt forms, such as the sodium, lithium and potassium, preferably sodium, salt forms and ammonium, alkyl- and substituted alkylammonium salt forms, e.g. in which the cation is of formula $R_{12}R_{13}R_{14}N^{\oplus}R_{15}$ wherein $R_{12}$, $R_{13}$, $R_{14}$ and $R_{15}$, independently, signify a hydrogen atom or an alkyl radical of 1 to 4 carbon atoms, unsubstituted or substituted by 1 or 2, preferably 1, hydroxy group, e.g. mono-, di- and tri-ethanolammonium, mono-, di- and tri-isopropanolammonium and tetramethylammonium salt forms.

The invention also provides a process for the production of the compounds of the invention, characterised by (a) sulphonating a compound of formula II,

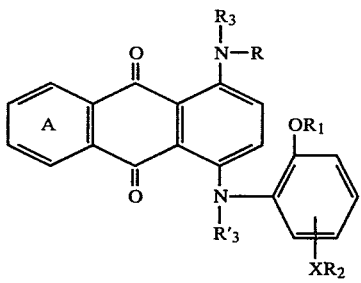

in which
ring A, R, $R_1$, $R_2$ and X are as defined above, and
$R_3$ and $R_3'$, independently, signify hydrogen or acyl, with the proviso that at least one signifies hydrogen, or (b) reacting a compound of formula III,

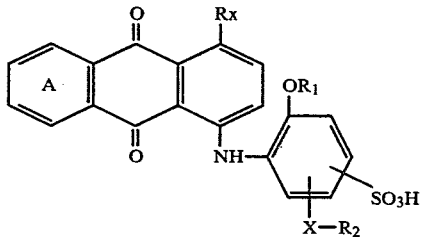

in which
ring A, $R_1$, $R_2$ and X are as defined above,
Rx signifies a group —$NH_2$ or a group reactable with —$NH_2$,
which compound is optionally in leuco or partial leuco form,
with a compound of formula IV, $$Ry-R \qquad IV$$

in which
R is as defined above, and
Ry signifies a halogen or an —$NH_2$ group,
with the proviso that at least one of Rx and Ry signifies —$NH_2$,
and oxidizing any leuco form in the resulting compound.

Where, in the compounds of formula I, $R_3$ or $R_3'$ signifies an acyl group, such group is a low-molecular acyl radical of an aliphatic carboxylic acid which is easily split off by saponification, preferably an acetyl radical. This group is split off during sulphonation.

Process (a) is conveniently carried out in conventional manner for sulphonation reactions, e.g. by treatment with $SO_3$ or with an agent yielding $SO_3$, such as by treatment with $SO_3$ gas, e.g. in an inert solvent such as chloroform, 1,2-dichloroethane or nitrobenzene, for example at a temperature of from 0° to 50° C., preferably from 15 to 30° C. The sulphonation is preferably carried out using distilled oil of vitriol (96% to 100%) or with oleum containing 15% $SO_3$, e.g. at the temperatures indicated above. The sulphonation may also be carried out by employing sulpho-chlorination techniques, e.g. using chlorosulphonic acid in inert solvents as indicated above and at temperatures indicated above and subsequently hydrolysing the resulting product in basic medium. When the compounds of the invention are obtained by sulphonation of compounds II in sulphonic acid or oleum, they can be precipitated by pouring the reaction mixture onto water or ice or by pouring into salt solutions whereby the salt forms of the compound of the invention are obtained. The precipitated product is expediently filtered and the filtrate neutralised with an aqueous basic solution.

In the compounds of formula IV, where Ry signifies a halogen, such halogen is conviently chlorine, or bromine, preferably bromine. However, in the compounds of formula IV, Ry is preferably —$NH_2$.

As examples of groups, as Rx, reactable with —$NH_2$, may be given hydroxy, $C_{1-4}$ alkoxy, preferably methoxy, and halogen, e.g. chlorine, iodine and, preferably bromine.

Where, in the compounds of formula III, Rx signifies —$NH_2$ or hydroxy, such compounds may be in leuco form.

The type of reaction involved in process (b) is well-known in the chemistry of anthraquinone dyestuffs. Thus, for example, where Rx and Ry each signify primary amino radicals, the reaction may be carried out in a solvent, such as in water or in a polar organic solvent, e.g. dimethyl formamide, dimethylsulphoxide or nitrobenzene. A suitable reaction temperature is from 50° C. to reflux temperature, preferably, however, not above 200° C. and more preferably between 120° to 180° C. The reaction may be initiated at room temperature. A similar procedure is adopted where Rx signifies hydroxy, although in this case, the reaction is preferably carried out in an organic solvent e.g. in an alcohol and in the presence of a condensation catalyst such as boric acid. Similarly, where Rx is alkoxy and Ry is a primary amino group, and where one of Rx and Ry is primary amino and the other halogen, the reaction may be carried out in similar manner to above in an inert organic solvent, in the latter case in the presence of an acid-binding agent such as an alkali-metal acetate, carbonate, bicarbonate or hydroxide and preferably in the presence of a copper catalyst, e.g. in the presence of powdered copper or in the presence of cuprous chloride or cuprous oxide.

Preferably, compounds of formula III where X is halogen are reacted with compounds IV where Ry is a primary amino group.

Where starting materials in leuco-form are employed, the resulting product, as will be appreciated, will also be in leuco-form. Such may be converted in conventional manner into compounds of the invention e.g. by treatment with air or by use of other mild oxidizing agents such as hydrogen peroxide, if necessary after neutralisation.

The resulting compounds of the invention may be isolated and purified using conventional techniques.

The compounds of formula II may be obtained in conventional manner, e.g. by reacting a compound of formula V,

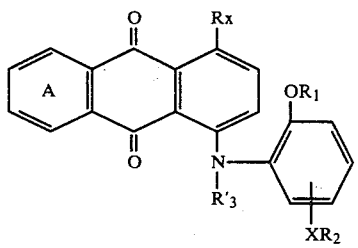

in which ring A, R₁, R₂, R₃' and Rx are as defined above,
or the corresponding leuco compound, with a compound of formula IV stated above, or by reacting a compound or formula VI,

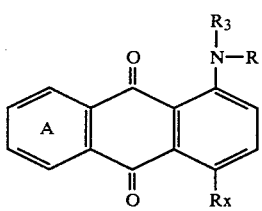

in which ring A, R, R₃ and Rx are as defined above, or the corresponding leuco compound, with a compound of formula VII,

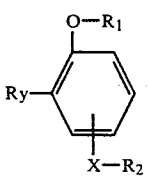

in which R₁, R₂ and Rx are as defined above, and, where required, oxidizing any resulting product in leuco form to the corresponding anthraquinone compound.

The reactions of the compounds of formula V with those of formula IV and the compounds of formula VI with the compounds of formula VIII may be carried out in analogous manner to process (b), described above.

The compounds of formula III may be produced, for example, by sulphonation of compounds of formula V, conveniently in analogous manner to process (a), described above.

The compounds of the invention are indicated for use as anionic dyes. They may be employed in the dyeing of any substrate dyeable with anionic dyes, for example natural or synthetic polyamides, polyvinyl alcohols, basic modified propathene, polyacrylonitrile, polyurethanes and natural or regenerated cellulose. Said substrates are conveniently employed in the form of fibres, e.g. loose fibres, yarns, filaments, woven and knit fabrics, non-wovens, felts, velvet, carpets, semi-finished and finished products. Leather and paper can also be dyed. The compounds of formula I are particularly suitable for the dyeing of textiles of natural or, preferably, synthetic polyamides.

The dyeing may be carried out in conventional manner, e.g. by exhaust or pad dyeing or printing methods. The most suitable method and the kind and quality of the substrate will of course be adapted to each other in the usual fashion.

Natural polyamides to be considered here are chiefly wool and silk, synthetic polyamides are chiefly polycondensation products of dibasic organic acids, e.g. adipic or sebacic acid and hexamethylene diamine, or of -aminoundecylic acid or poly- -caprolactam, mainly polyamide 6, polyamide 66 and polyamide 11.

Dye concentration in relation to the substrates to be dyed is selected according to the required depth of colour and conveniently is up to 7%, preferably 0.5–2% for wool, in relation to the pure dyestuff. For synthetic polyamides and silk the dye concentration expediently is up to 2%, preferably 0.25 to 1% in relation to the pure dyestuff.

With exhaust dyeing methods, the goods to liquor ratio conveniently is 1:10–1:40 and the dyeing is expediently commenced at temperatures between 20° and 50° C., preferably between 30° and 40° C. and concluded by slowly raising the liquor to 98°–100° C.

The compounds of the invention build up from neutral liquors. However, in order to obtain satisfactory bath exhaustion it is advisable to add a suitable acid, e.g. formic acid, acetic acid or ammonium sulphate. The pH value of the dye liquor may be 2–7, preferably 4–5. Conveniently the acids are added in the following concentrations, in relation to the substrate: formic and acetic acid 1–4%, preferably 1–2%, ammonium sulphate 2–5%. The addition of the acid may take place during the dyeing process or preferably at the beginning thereof. In addition to the compounds of the invention, the dye liquor may contain further additives such as exhaustion assistants and, optionally, buffering agents.

The compounds of formula I are also suitable for employment in continuous or discontinuous padding processes for which the dye concentration conveniently has the values indicated above and the liquor may contain in addition to the dye conventional assistants, e.g. thickeners, build-up assistants, dispersants, fixation agents, etc. The impregnated goods may be subjected to any known fixation method, e.g. to the cold-retention process, to steaming with saturated steam or to thermofixation. With thermofixation, selection of the temperature must be made according to the substrate to prevent damage to the fabric. Pad-dyeings on polyamide 6, for example, are conveniently thermofixed at 180°–195° C., while pad-dyeings on polyamide 66 can be thermofixed at 200°–210° C. It is convenient to dry the impregnated goods prior to steaming or thermofixation, for example at 100°–120° C.

The compounds of the invention are also suitable for use in printing processes, e.g. using aqueous printing pastes containing the usual additives (thickener, such as locust bean flour or dextrine, printing paste stabilizers, dispersants, buffering agents, etc.). The printed goods are subsequently fixed in saturated steam, optionally after an intermediate drying step.

The fixed dyeings are advantageously rinsed, optionally washed with a suitable detergent, rinsed again and dried.

The compounds of the invention may also be employed in water-saving dyeing processes using wetting agents or the formation of a micro foam.

The dyeings obtained on natural and synthetic polyamides exhibit notable wet fastness properties, in particular fastness to washing, water, perspiration. They also possess fastness properties to rubbing; light, sea water, chlorinated water, potting, fumes and thermofixation, as well as resistance to acid and alkali. The dyeings on wool are fast to fulling. The dyeings also show good dischargeability and can be easily dry-cleaned.

The compounds have good solubility in water and can be converted to liquid or granulated preparations such as are described in French Pat. Nos. 1,572,040 and 1,581,900. They possess notable levelling and migration properties. They reserve nylon to be dyed in stripes and have good build-up capacity. They can be combined with each other or with other dyes which build up from neutral liquors, e.g. anthraquinone dyes with this property. They also show stability to hard water.

In the following Examples parts and percentages are by weight and the temperatures are in degrees centigrade.

EXAMPLE 1

A mixture of 16 parts 1-amino-4-cyclohexylaminoanthraquinone, 10 parts sodium carbonate, 1 part cuprous chloride and 100 parts 4-methyl-2-bromanisol is stirred for 15 hours at a temperature of 145°–150°. Isolation is effected by steam distillation which causes the reaction product to settle out in crystalline form. After filtration and washing to neutral with water a product of formula XI,

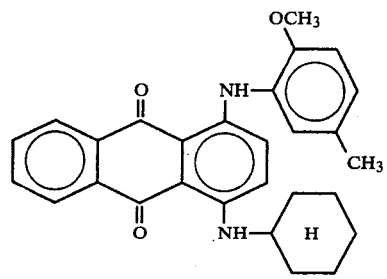

is obtained in the form of a blue powder. This is stirred into 10 times its quantity of a 10–15% oleum solution at 10°–15° and stirring is continued for another 3 hours at the same temperature. Subsequently it is poured onto a mixture of ice and sodium chloride and the settled-out dye is filtered. The dye is made into a paste by mixing with a little water, adjusted to pH 7 with soda lye and dried.

Polyamide textiles, e.g. nylon and wool are dyed from weakly acid bath in pure bluish green shades which show notable wet and light fastness properties.

Table 1 below list the structure of further dyes. They may be produced according to the procedure indicated in Example 1 and agree in the free acid form with formula XII,

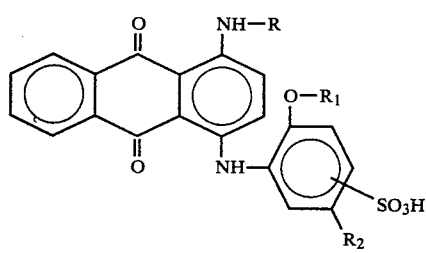

in which R, $R_1$ and $R_2$ have the significances listed in the appropriate columns. A further column lists the shade of the dyeing on nylon.

TABLE 1

| Ex. No. | R | $R_1$ | $R_2$ | Shade on nylon |
|---|---|---|---|---|
| 2 | —⟨H⟩ | —$C_2H_5$ | —$CH_3$ | blue green |
| 3 | " | —$C(CH_3)_3$ | " | " |
| 4 | " | —$CH_3$ | —$C_2H_5$ | " |
| 5 | " | —$C_2H_5$ | " | " |
| 6 | " | —$C(CH_3)_3$ | " | " |
| 7 | " | —$CH_3$ | —$CH_2$—$CH(CH_3)_2$ | " |
| 8 | " | —$C_2H_5$ | " | " |
| 9 | " | —$C(CH_3)_3$ | " | " |
| 10 | " | —$CH_3$ | —$C(CH_3)_3$ | " |
| 11 | " | —$C_2H_5$ | " | " |
| 12 | " | —$C(CH_3)_3$ | " | " |
| 13 | —⟨H⟩(CH_3)(CH_3)(CH_3) | —$C_2H_5$ | —$CH_3$ | " |

TABLE 1-continued

| Ex. No. | R | R₁ | R₂ | Shade on nylon |
|---|---|---|---|---|
| 14 | " | —C(CH₃)₃ | " | " |
| 15 | " | —CH₃ | —C₂H₅ | " |
| 16 | " | —CH₃ | —CH₃ | " |
| 17 | " | —C₂H₅ | —C₂H₅ | " |
| 18 | " | —C(CH₃)₃ | " | " |
| 19 | " | —CH₃ | —CH₂—CH(CH₃)₂ | " |
| 20 | " | —C₂H₅ | " | " |
| 21 | " | —C(CH₃)₃ | " | " |
| 22 | " | —CH₃ | —C(CH₃)₃ | " |
| 23 | " | —C₂H₅ | " | " |
| 24 | " | —C(CH₃)₃ | " | " |
| 25 | 2-methylcyclohexyl (CH₃ on ring with H) | —C₂H₅ | —CH₃ | " |
| 26 | " | —C(CH₃)₃ | " | " |
| 27 | " | —CH₃ | —C₂H₅ | " |
| 28 | " | —CH₃ | —CH₃ | " |
| 29 | " | —C₂H₅ | —C₂H₅ | " |
| 30 | " | —C(CH₃)₃ | " | " |
| 31 | " | —CH₃ | —CH₂—CH(CH₃)₂ | " |
| 32 | " | —C₂H₅ | " | " |
| 33 | " | —C(CH₃)₃ | " | " |
| 34 | " | —CH₃ | —C(CH₃)₃ | " |
| 35 | " | —C₂H₅ | " | " |
| 36 | " | —C(CH₃)₃ | " | " |
| 37 | 3-methylcyclohexyl (CH₃ on ring with H) | —CH₃ | —CH₃ | " |
| 38 | " | —C₂H₅ | " | " |
| 39 | " | —C(CH₃)₃ | " | " |
| 40 | " | —CH₃ | —C₂H₅ | " |
| 41 | " | —C₂H₅ | " | " |
| 42 | " | —C(CH₃)₃ | " | " |
| 43 | " | —CH₃ | —CH₂—CH(CH₃)₂ | " |
| 44 | " | —C₂H₅ | " | " |
| 45 | " | —C(CH₃)₃ | " | " |
| 46 | " | —CH₃ | —C(CH₃)₃ | " |
| 47 | " | —C₂H₅ | " | " |
| 48 | " | —C(CH₃)₃ | " | " |
| 49 | 4-methylcyclohexyl (H—ring—CH₃) | —CH₃ | —CH₃ | " |
| 50 | " | —C₂H₅ | " | " |
| 51 | " | —C(CH₃)₃ | " | " |
| 52 | " | —CH₃ | —C₂H₅ | " |
| 53 | " | —C₂H₅ | " | " |
| 54 | " | —C(CH₃)₃ | " | " |
| 55 | " | —CH₃ | —CH₂—CH(CH₃)₂ | " |

TABLE 1-continued

| Ex. No. | R | R₁ | R₂ | Shade on nylon |
|---|---|---|---|---|
| 56 | " | —C₂H₅ | " | " |
| 57 | " | —C(CH₃)₃ | " | " |
| 58 | " | —CH₃ | —C(CH₃)₃ | " |
| 59 | " | —C₂H₅ | " | " |
| 60 | " | —C(CH₃)₃ | " | " |
| 61 | $-\underset{H}{C_2H_5}\langle\text{cyclohexyl}\rangle$ | —CH₃ | —CH₃ | " |
| 62 | " | —C₂H₅ | " | " |
| 63 | " | —C(CH₃)₃ | " | " |
| 64 | " | —CH₃ | —C₂H₅ | " |
| 65 | " | —C₂H₅ | " | " |
| 66 | " | —C(CH₃)₃ | " | " |
| 67 | " | —CH₃ | —CH₂—CH(CH₃)₂ | " |
| 68 | " | —C₂H₅ | " | " |
| 69 | " | —C(CH₃)₃ | " | " |
| 70 | " | —CH₃ | —C(CH₃)₃ | " |
| 71 | " | —C₂H₅ | " | " |
| 72 | " | —C(CH₃)₃ | " | " |
| 73 | —CH((CH₂)₃—CH₃)(CH₂—CH₃) | —CH₃ | —CH₃ | " |
| 74 | " | —C₂H₅ | " | " |
| 75 | " | —C(CH₃)₃ | " | " |
| 76 | " | —CH₃ | —C₂H₅ | " |
| 77 | " | —C₂H₅ | " | " |
| 78 | " | —C(CH₃)₃ | " | " |
| 79 | " | —CH₃ | —CH₂—CH(CH₃)₂ | " |
| 80 | " | —C₂H₅ | " | " |
| 81 | " | —C(CH₃)₃ | " | " |
| 82 | " | —CH₃ | —C(CH₃)₃ | " |
| 83 | " | —C₂H₅ | " | " |
| 84 | " | —C(CH₃)₃ | " | " |
| 85 | —CH(CH₂—CH(CH₃)(CH₃))(CH₂—CH(CH₃)(CH₃)) | —CH₃ | —CH₃ | " |
| 86 | " | —C₂H₅ | " | " |
| 87 | " | —C(CH₃)₃ | " | " |
| 88 | " | —CH₃ | —C₂H₅ | " |
| 89 | " | —C₂H₅ | " | " |
| 90 | " | —C(CH₃)₃ | " | " |
| 91 | " | —CH₃ | —CH₂—CH(CH₃)₂ | " |
| 92 | " | —C₂H₅ | " | " |
| 93 | " | —C(CH₃)₃ | " | " |
| 94 | " | —CH₃ | —C(CH₃)₃ | " |
| 95 | " | —C₂H₅ | " | " |

TABLE 1-continued

| Ex. No. | R | R₁ | R₂ | Shade on nylon |
|---------|---|-----|-----|----------------|
| 96 | " | —C(CH₃)₃ | " | " |

EXAMPLE 97

Into a melt consisting of 30 parts 1-amino-2-methoxy-5-methylbenzene and 19 parts 1-cyclohexylamino-4-bromo-anthraquinone a mixture is entered at 100°–110°, consisting of 50 parts technical anhydrous potassium acetate, 0.01 part cuprous chloride and 0.15 parts water. The melt is stirred for 20 hours at 100°–110°. Subsequently the melt is precipitated on 300 parts methylcarbitol, 60 parts water and 70 parts 30% hydrochloric acid. The mixture is stirred further until the 1-cyclohexylamino-4-(2′-methoxy-5′-methylphenylamino)-anthraquinone has separated in filtrable form. The anthraquinone compound is filtered and washed to neutral with water. A compound of formula XI is obtained which is processed further as described in Example 1.

EXAMPLES 98–102

The procedure of Example 97 is followed, but instead of 1-cyclohexylamino-4-bromo-anthraquinone equivalent quantities of one of the anthraquinone compounds listed below are employed to obtain dyes which similarly good dyeing properties.

ANTHRAQUINONE COMPOUNDS

EXAMPLE 98

1-(2′-methylcyclohexylamino)-4-bromo-anthraquinone (cf. Expl. 28)

EXAMPLE 99

1-(3′-methylcyclohexylamino)-4-bromo-anthraquinone (cf. Expl. 37)

EXAMPLE 100

1-(4′-methylcyclohexylamino)-4-bromo-anthraquinone (cf. Expl. 49)

EXAMPLE 101

1-(2′-ethylcyclohexylamino)-4-bromo-anthraquinone (cf. Expl. 61)

EXAMPLE 102

1-(3′-dimethyl-5′-methylcyclohexylamino)-4-bromo-anthraquinone (cf. Expl. 16)

EXAMPLE 103

Into a melt consisting of 50 parts 1-amino-2-methoxy-5-methylbenzene and 42.6 parts 1-(N-acetyl-N-cyclohexylamino)-4-bromo-anthraquinone (obtained by reacting 1-cyclohexylamino-4-bromo-anthraquinone with acetic anhydride) a mixture is entered at 110°, consisting of 7.5 parts technical anhydrous potassium acetate, 0.05 parts cuprous chloride and 0.3 parts water. The mixture is stirred for 20 hours at 100°–110°; subsequently the melt is precipitated on 500 parts methylcarbitol, 100 parts water and 100 parts 30% hydrochloric acid. 1-(N-acetyl-N-cyclohexylamino)-4-(2′-methoxy-5′-methylphenylamino)-anthraquinone settles out. It is filtered, washed with a mixture of 1 part methylcarbitol and 0.5 parts 1-n-hydrochloric acid and subsequently with water and dried.

15 Parts of the 1-(N-acetyl-N-cyclohexylamino)-4-(2′-methoxy-5′-methylphenylamino)-anthraquinone thus obtained are dissolved in 35 parts concentrated sulphuric acid and 15 parts 25% oleum and the solution is stirred for 3 hours at 25°. The solution is poured onto a mixture consisting of ice and sodium chloride, the precipitation stirred for 20 hours, the settlement obtained is filtered and washed with a 12% aqueous sodium chloride solution. A paste is prepared with the dye and water, adjusted to pH 7 with an aqueous sodium hydroxide solution and dried. The dye obtained is the same as in Example 1.

EXAMPLE 104

A mixture consisting of 16 parts 1-cyclo-hexylamino-4-hydroxyanthraquinone and leuco-1-cyclohexylamino-4-hydroxyanthraquinone (obtained by reacting cyclohexylamine with leuco-1,4-dihydroxyanthraquinone), 10 parts crystalline boric acid, 30 parts 1-amino-2-methoxy-5-methylbenzene and 100 parts iso-octylalcohol is stirred for 20 hours at 70° and the iso-octylalcohol steam-distilled. The residual separated reaction product is filtered, washed with acidified water, then with water and dried. By means of chromatographic analysis on an alumina column a compound with a melting point of 164° is obtained which is identical with the 1-(2′-methoxy-5′-methylphenylamino)-4-cyclohexylamino-anthraquinone mentioned in Example 1.

EXAMPLE 105

A mixture consisting of 18.5 parts of a compound of formula XIII,

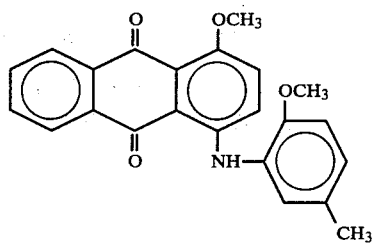

(obtained by methylating the corresponding 1-hydroxyanthraquinone compound), 20 parts cyclohexylamine and 80 parts nitrobenzene is stirred for 12 hours at 150°. The nitrobenzene as well as excessive cyclohexylamine are steam-distilled on which the reaction product precipitates. The reaction product is filtered and dried. It is of formula XI and is sulphonated according to the procedure in Example 1.

EXAMPLE 106

A mixture consisting of 23.5 parts of a compound of formula XIV,

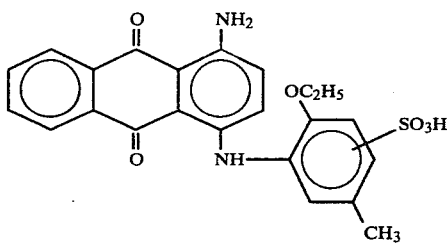

XIV

[obtained by sulphonating 1-amino-4-(2'-ethoxy-5'-methylphenylamino)-anthraquinone], 100 parts cyclohexylamine, 100 parts water and 15 parts sodium hydrosulfite is stirred for 8 hours at 40°. At a temperature of 30° 100 parts of a 10% aqueous sodium hydroxide solution are feed into the mixture. Air is passed into the reaction mixture until the leuco-compound is oxidized. The dye is salted out with sodium chloride, filtered and washed with a 12% aqueous sodium chloride solution. Thus the same dye is obtained as is described in Example 1.

EXAMPLE 107

A mixture consisting of 16 parts 1-amino-4-cyclohexylamino-anthraquinone, 8 parts sodium carbonate, 1 part cuprous chloride and 50 parts 2,5-dimethoxybromobenzene is stirred for 10 hours at 145°–150°. The reaction mixture is isolated by precipitation on a 80% ethanol solution. The crystalline paste thus obtained is filtered and washed to neutral with water. A product of formula XV,

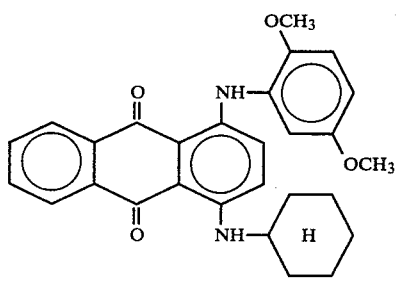

XV in the form of a blue powder is obtained. This is subsequently sulphonated as described in Example 1.

Table 2 below lists the structure of further dyes. They can be produced according to the procedure in Example 107 and agree with formula XVI,

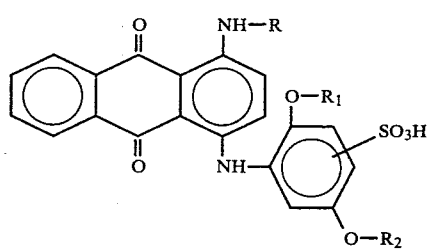

XVI wherein
R, $R_1$ and $R_2$ have the significances given in the appropriate column. A further column lists the shade of the dyeing on nylon.

TABLE 2

| Ex. No. | R | $R_1$ | $R_2$ | Shade on nylon |
|---|---|---|---|---|
| 108 | —⟨H⟩ | —$C_2H_5$ | —$C_2H_5$ | blue green |
| 109 | $CH_3$—⟨H⟩ | —$CH_3$ | —$CH_3$ | blue green |
| 110 | $CH_3$—⟨H⟩ | —$C_2H_5$ | —$C_2H_5$ | blue green |
| 111 | ⟨H⟩—$CH_3$ (2-position) | —$CH_3$ | —$CH_3$ | blue green |
| 112 | ⟨H⟩—$CH_3$ | —$C_2H_5$ | —$C_2H_5$ | blue green |
| 113 | ⟨H⟩—$CH_3$ | —$CH_3$ | —$CH_3$ | blue green |
| 114 | ⟨H⟩—$CH_3$ | —$C_2H_5$ | —$C_2H_5$ | blue green |
| 115 | ⟨H⟩ with $CH_3$, $CH_3$, $CH_3$ | —$CH_3$ | —$CH_3$ | blue green |
| 116 | ⟨H⟩ with $CH_3$, $CH_3$, $CH_3$ | —$C_2H_5$ | —$C_2H_5$ | blue green |
| 117 | ⟨H⟩ with $CH_3$, $CH_3$, $CH_3$ | —$CH_3$ | —$CH_3$ | blue green |
| 118 | ⟨H⟩ with $CH_3$, $CH_3$, $CH_3$ | —$C_2H_5$ | —$C_2H_5$ | blue green |
| 119 | $C_2H_5$—⟨H⟩ | —$CH_3$ | —$CH_3$ | blue green |
| 120 | $C_2H_5$—⟨H⟩ | —$C_2H_5$ | —$C_2H_5$ | blue green |
| 121 | —CH($(CH_2)_3$—$CH_3$)($CH_2$—$CH_3$) | —$CH_3$ | —$CH_3$ | blue green |

TABLE 2-continued

| Ex. No. | R | R₁ | R₂ | Shade on nylon |
|---|---|---|---|---|
| 122 | —CH(—(CH₂)₃—CH₃)(—CH₂—CH₃) | —C₂H₅ | —C₂H₅ | blue green |
| 123 | —CH(—CH₂—CH(CH₃)(CH₃))(—CH₂—CH(CH₃)(CH₃)) | —CH₃ | —CH₃ | blue green |
| 124 | —CH(—CH₂—CH(CH₃)(CH₃))(—CH₂—CH(CH₃)(CH₃)) | —C₂H₅ | —C₂H₅ | blue green |

APPLICATION EXAMPLE A

In a dye bath consisting of 4000 parts water, 10 parts anhydrous sodium sulphate and 2 parts of the saline dye of Example 1, 100 parts of a pre-wetted synthetic polyamide woven fabric, e.g. nylon, are entered at 40°.

The dye liquor is raised to boiling temperature in 30 minutes at which it is maintained for one hour. 4 Parts glacial acetic acid are added and the dyeing is concluded after boiling was continued for 30 minutes.

Evaporated water is continually replaced during dyeing. The nylon dyed in a bluish green shade is removed from the liquor, rinsed with water and dried. Wool can also be dyed according to the same procedure. The dyeings show good light and wet fastness properties.

APPLICATION EXAMPLE B

The procedure of Application Example A is followed, but the 4 parts glacial acetic acid are added at the beginning of the dyeing. A level dyeing with the same fastness properties as are obtained with Application Example A results.

APPLICATION EXAMPLE C

A polyamide knit fabric is impregnated with an aqueous padding liquor containing
10 g/l dye of Example 1
50 g/l butyldiethylene glycol
20 g/l polyethylene glycol with molecular weight 300 (Carbowax 300)
2 g/l alginates
at 30% dry weight pick-up and at 60°. The impregnated substrate is dried at 120° and thermofixed at 200°–210°.

The material is rinsed, washed, rinsed again and dried. An attractive bluish green dyeing with good fastness properties is obtained.

APPLICATION EXAMPLE D

A polyamide 6 knit fabric is impregnated with an aqueous padding liquor containing
10 g/l dye of Example 1
10 g/l octylphenylpentaethyleneglycol ether
2 g/l of a 60% lauryldiethyleneglycolether sulphate solution
4 g/l sodium alginate
at a pick-up rate of 40% on dry weight at 25°–30° and subsequently dried at 110°. Fixation is carried out by saturated steam at 101°–103° for 10 minutes.

The dyed material is rinsed, washed, rinsed again and dried. An attractive bluish green dyeing with good fastness properties is obtained.

APPLICATION EXAMPLE E

A polyamide 66 knit fabric is printed according to the rotary screen printing method with a printing paste of the following composition.

| | |
|---|---|
| 10 parts | dye of Example 1 |
| 50 parts | urea |
| 500 parts | 13% locust bean flour thickener |
| 60 parts | ammonium tartrate |
| 380 parts | water |
| 1000 parts | |

The printed goods are dried and fixed in saturated steam for 20 minutes.

In analogous manner, the dyes of Examples 2–96 and 107–124 can be employed in the above Application Examples A to E resulting in bluish green dyeings with good fastness properties.

What is claimed is:
1. A compound of the formula

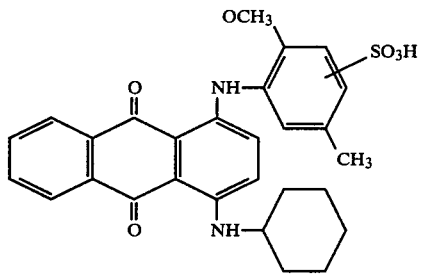

or the salt form of said compound, the cation of which is non-chromophoric.

* * * * *